United States Patent
Lim et al.

(10) Patent No.: US 11,057,253 B2
(45) Date of Patent: *Jul. 6, 2021

(54) METHODS AND APPARATUS FOR TRANSMITTING/RECEIVING HE-SIG B

(71) Applicant: LG ELECTRONICS INC., Seoul (KR)

(72) Inventors: Dongguk Lim, Seoul (KR); Jinyoung Chun, Seoul (KR); Wookbong Lee, Seoul (KR); Jeongki Kim, Seoul (KR); Hangyu Cho, Seoul (KR); Jinmin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/540,517

(22) PCT Filed: Jan. 22, 2016

(86) PCT No.: PCT/KR2016/000728
§ 371 (c)(1),
(2) Date: Jun. 28, 2017

(87) PCT Pub. No.: WO2016/126034
PCT Pub. Date: Aug. 11, 2016

(65) Prior Publication Data
US 2017/0373901 A1    Dec. 28, 2017

Related U.S. Application Data

(60) Provisional application No. 62/110,608, filed on Feb. 2, 2015.

(51) Int. Cl.
*H04L 27/26*  (2006.01)
*H04L 5/00*   (2006.01)
(Continued)

(52) U.S. Cl.
CPC .......... *H04L 27/2613* (2013.01); *H04L 5/003* (2013.01); *H04W 48/12* (2013.01);
(Continued)

(58) Field of Classification Search
CPC ............... H04L 27/2613; H04L 5/003; H04W 72/0406; H04W 72/0453; H04W 48/12; H04W 84/12; H04B 7/0452
See application file for complete search history.

(56) References Cited

U.S. PATENT DOCUMENTS

| | | | |
|---|---|---|---|
| 8,811,507 B2 | 8/2014 | Baik et al. | |
| 2012/0120839 A1* | 5/2012 | Liu | H04L 1/0026 370/252 |

(Continued)

FOREIGN PATENT DOCUMENTS

| | | |
|---|---|---|
| CN | 102893535 | 1/2013 |
| CN | 103404187 | 11/2013 |

(Continued)

OTHER PUBLICATIONS

European Patent Office Application Serial No. 16000247.3, Search Report dated Jun. 10, 2016, 7 pages.

(Continued)

*Primary Examiner* — Mandish K Randhawa
(74) *Attorney, Agent, or Firm* — Lee, Hong, Degerman, Kang & Waimey PC

(57) ABSTRACT

A method and apparatus for transmitting frames having a signaling field (SIG) for a second type of station (STA) in a wireless communication system are provided. For this, STA prepares a frame having a first part for a first type of STA and a second part for the second type of STA. Here, the second part includes a first signaling field (HE-SIG A) for common control information and a second signaling field (HE-SIG B) for signaling information comprising user specific control (Continued)

information. Regarding the second signaling field, independent signaling information for the second signaling field (HE-SIG B) is to be transmitted for each 20 MHz bandwidth within a first 40 MHz bandwidth. And the signaling information of the first 40 MHz bandwidth is duplicated in a second 40 MHz bandwidth, when the frame is to be transmitted in a bandwidth equals to or greater than 80 MHz. STA transmits this prepared frame to one or more STAs.

15 Claims, 16 Drawing Sheets

(51) Int. Cl.
    *H04W 48/12*     (2009.01)
    *H04W 72/04*     (2009.01)
    *H04B 7/0452*     (2017.01)
    *H04W 84/12*     (2009.01)

(52) U.S. Cl.
    CPC ... *H04W 72/0406* (2013.01); *H04W 72/0453* (2013.01); *H04B 7/0452* (2013.01); *H04W 84/12* (2013.01)

(56) References Cited

U.S. PATENT DOCUMENTS

| | | | |
|---|---|---|---|
| 2012/0213305 A1* | 8/2012 | Oh | H04L 1/0083 375/267 |
| 2013/0058273 A1 | 3/2013 | Wentink et al. | |
| 2014/0119327 A1 | 5/2014 | Oh et al. | |
| 2014/0126509 A1 | 5/2014 | You | |
| 2014/0247824 A1 | 9/2014 | Sohn et al. | |
| 2014/0307612 A1 | 10/2014 | Vermani et al. | |
| 2015/0016558 A1 | 1/2015 | Choi et al. | |
| 2016/0212247 A1* | 7/2016 | Azizi | H04L 27/2613 |
| 2017/0201993 A1* | 7/2017 | Tomeba | H04W 72/0453 |
| 2017/0223734 A1* | 8/2017 | Lin | H04W 74/04 |

FOREIGN PATENT DOCUMENTS

| | | |
|---|---|---|
| CN | 105432050 | 3/2016 |
| JP | 2012523774 | 10/2012 |
| JP | 2013522950 | 6/2013 |
| JP | 2013534085 | 8/2013 |
| JP | 2016519909 | 7/2016 |
| WO | 2014172198 | 10/2014 |
| WO | 2014172201 | 10/2014 |
| WO | 2014/193547 | 12/2014 |
| WO | 2016056719 | 4/2016 |

OTHER PUBLICATIONS

PCT International Application No. PCT/KR2016/000728, Notification of Transmittal of the International Search Report and the Written Opinion of the International Searching Authority, or Declaration dated Apr. 28, 2016, 12 pages.

Katsuo Yunoki, "DL-OFDMA Map Frame," IEEE 802.11-15/0034r0, retrieved from the Internet: https://mentor.ieee.org/802.11/dcn/15/11-15-0034-00-00ax-dl-ofdma-map-frame.pptx>, Jan. 8, 2015, 13 pages.

Zhang, H. et al., "802.11ac Preamble Discussions", doc.: IEEE 802.11-09/1174r0, Nov. 2009, 10 pages.

The State Intellectual Property Office of the People's Republic of China Application Serial No. 201680008376.4, Office Action dated Oct. 11, 2019, 8 pages.

Intellectual Property Office of India Application Serial No. 201727022676, Office Action dated Sep. 17, 2020, 7 page.

* cited by examiner

[Fig. 1]
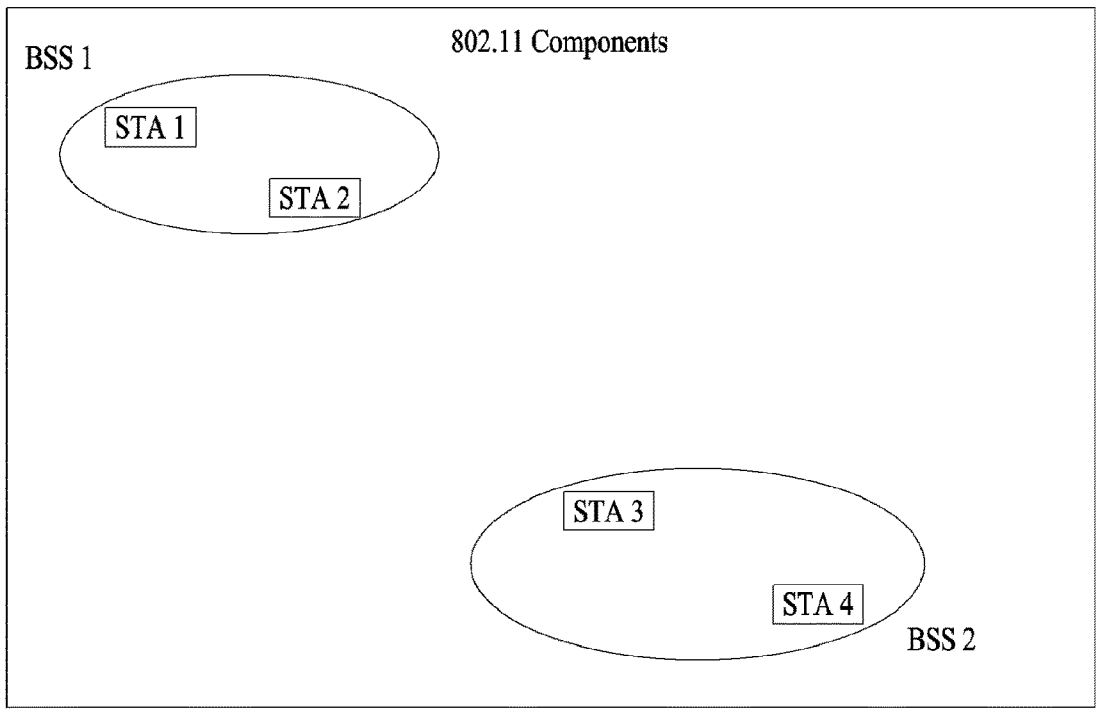
[Fig. 2]
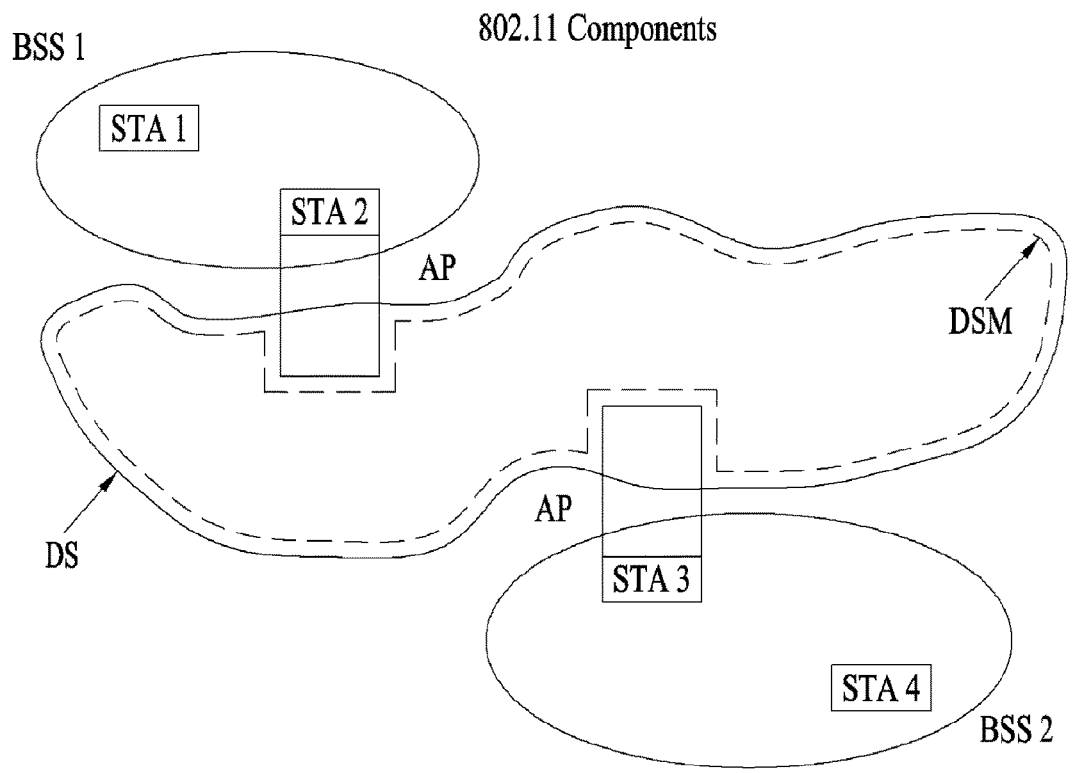

[Fig. 3]
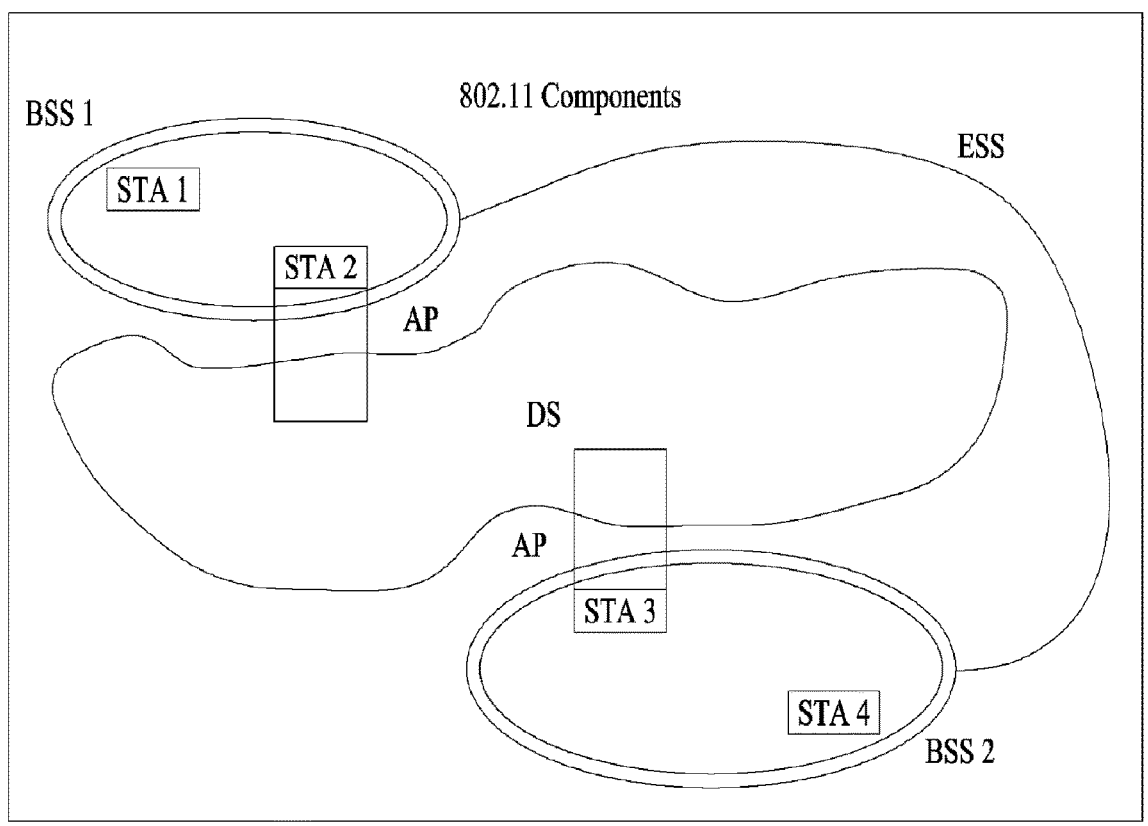

[Fig. 4]
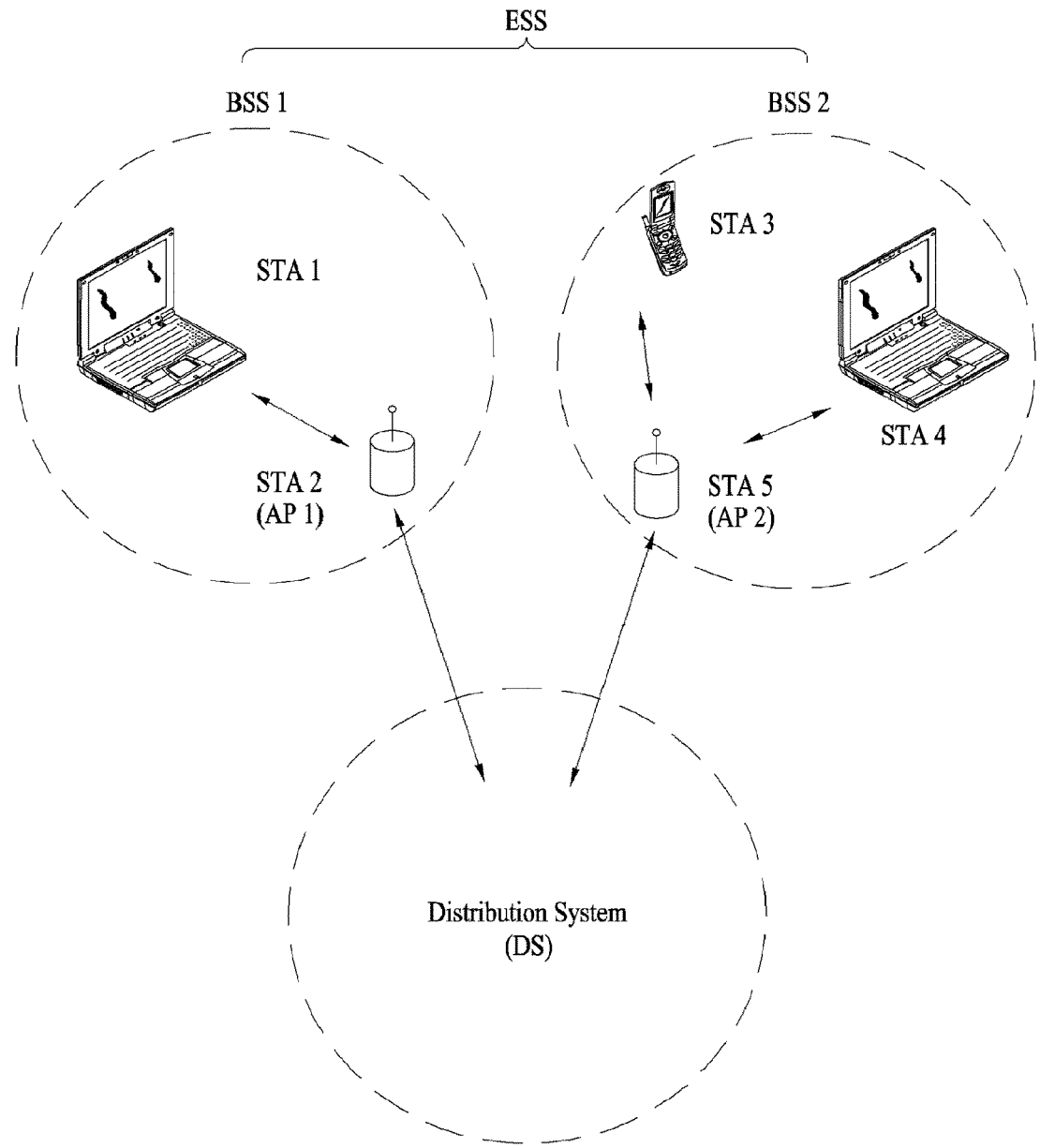
[Fig. 5]
| L-STF | L-LTF | L-SIG | HE-SIG A | HE-STF | HE-LTF | HE-SIG B | Data |
|-------|-------|-------|----------|--------|--------|----------|------|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

[Fig. 6]

| L-LTF | L-STF | L-SIG | Data |
|---|---|---|---|

PPDU format (IEEE 802.11a/g)

| L-LTF | L-STF | L-SIG | VHT-SIG A | HT-STF | HT-LTF | ... | HT-LTF | Data |
|---|---|---|---|---|---|---|---|---|

HT PPDU format (IEEE 802.11n)

| L-LTF | L-STF | L-SIG | VHT-SIG A | VHT-SFT | VHT-LTF | VHT-SIG B | Data |
|---|---|---|---|---|---|---|---|

VHT PPDU format (IEEE 802.11ac)

[Fig. 7]

| L-STF | L-LTF | L-SIG | HE-SIG A | | | | |
|---|---|---|---|---|---|---|---|
| L-STF | L-LTF | L-SIG | HE-SIG A | HE-SIG B | HE-STF | HE-LTF | Data |
| L-STF | L-LTF | L-SIG | HE-SIG A | | | | |
| L-STF | L-LTF | L-SIG | HE-SIG A | | | | |

[Fig. 8]

| L-STF | L-LTF | L-SIG | HE-SIG A | | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

[Fig. 9]
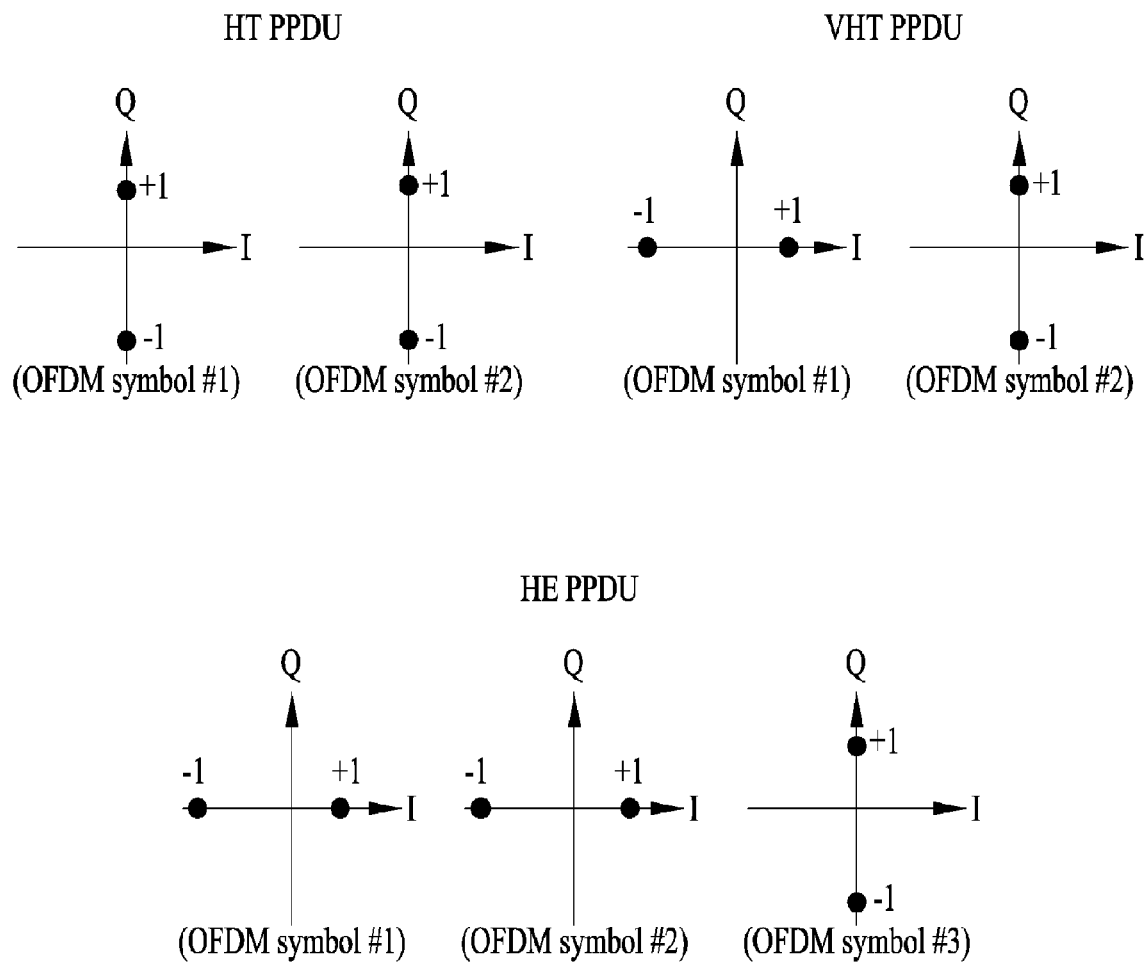

[Fig. 10]
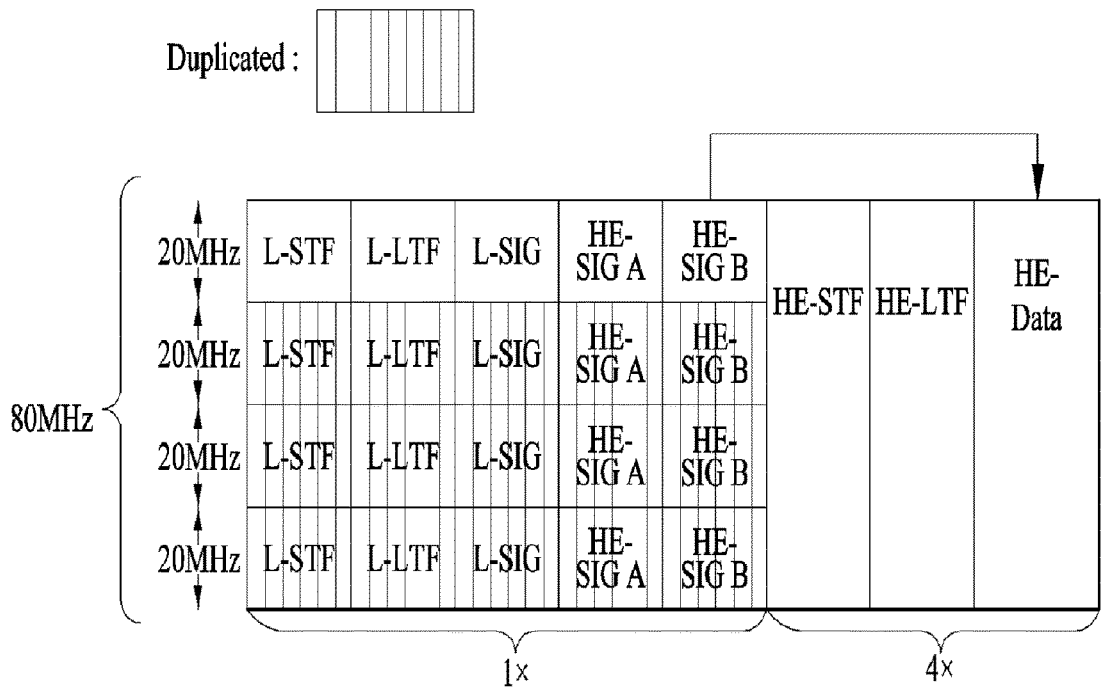
[Fig. 11]
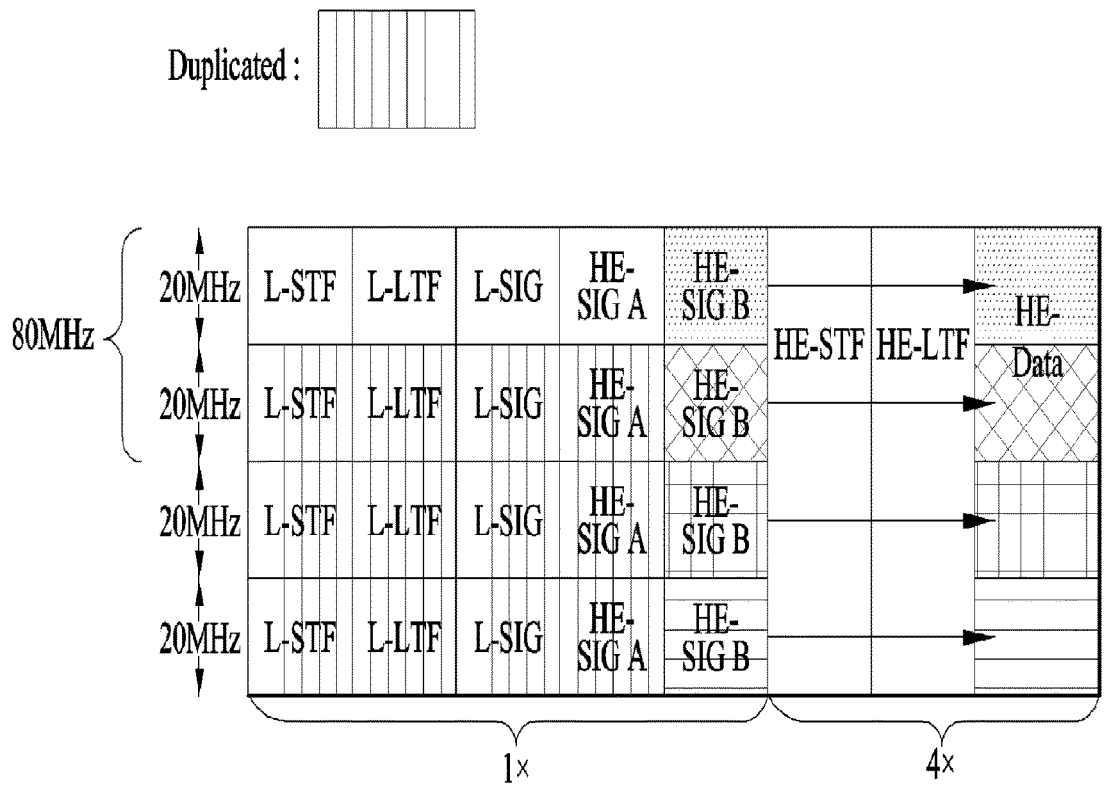

[Fig. 12]
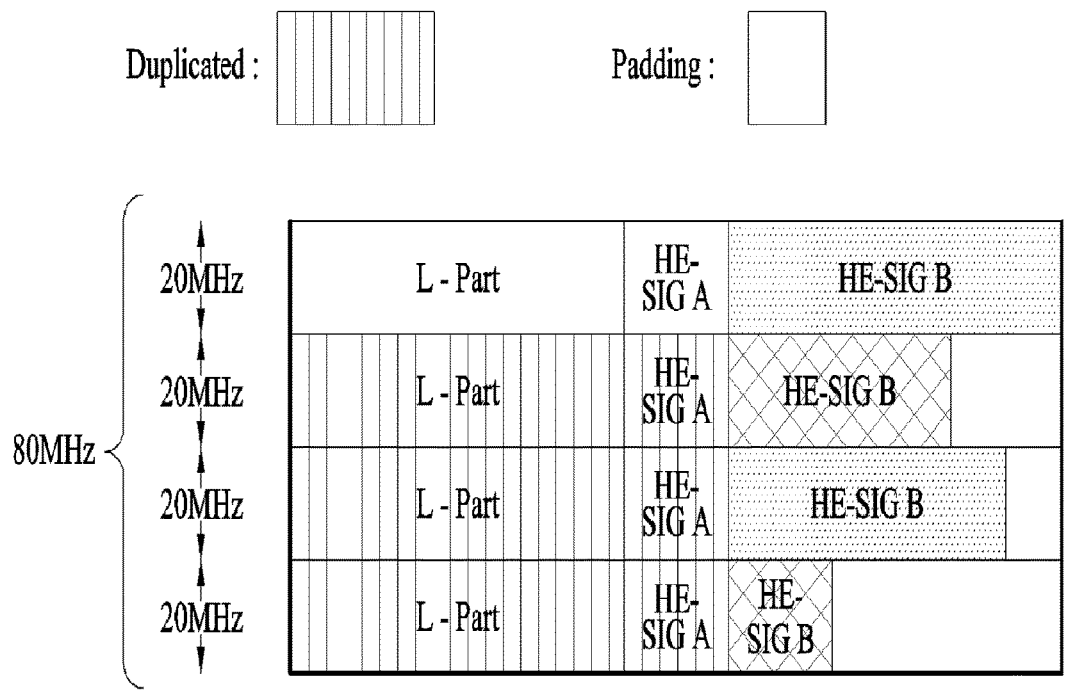
[Fig. 13]
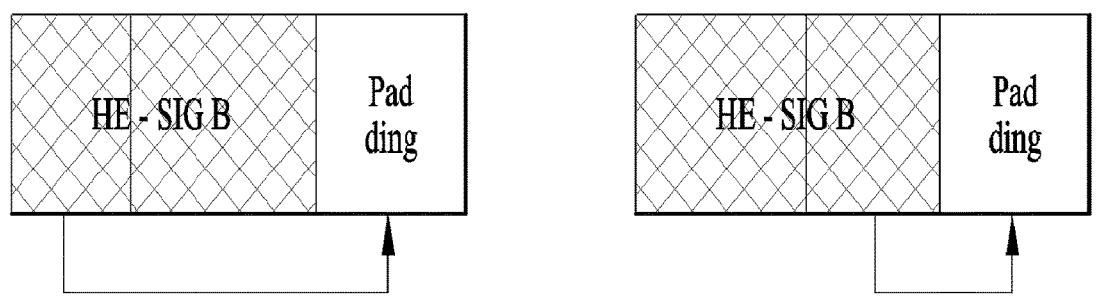

[Fig. 14]
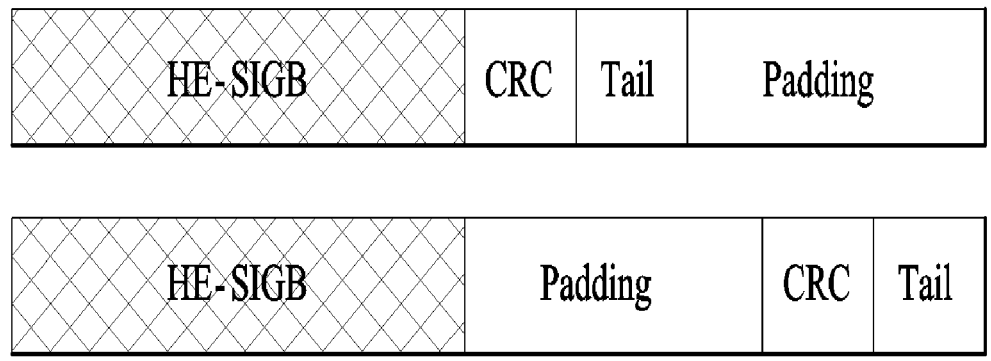
[Fig. 15]
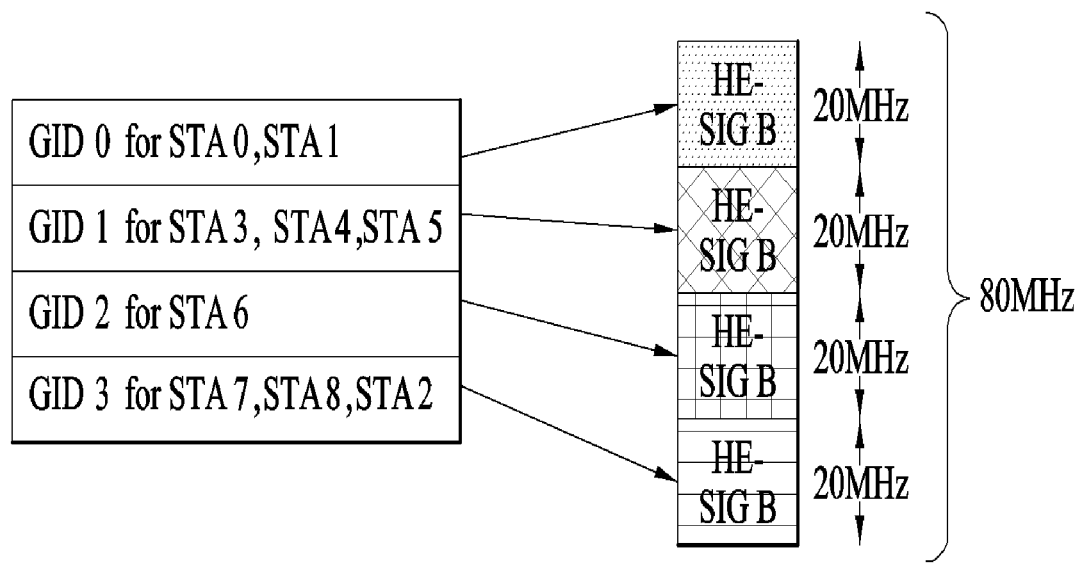

[Fig. 16]
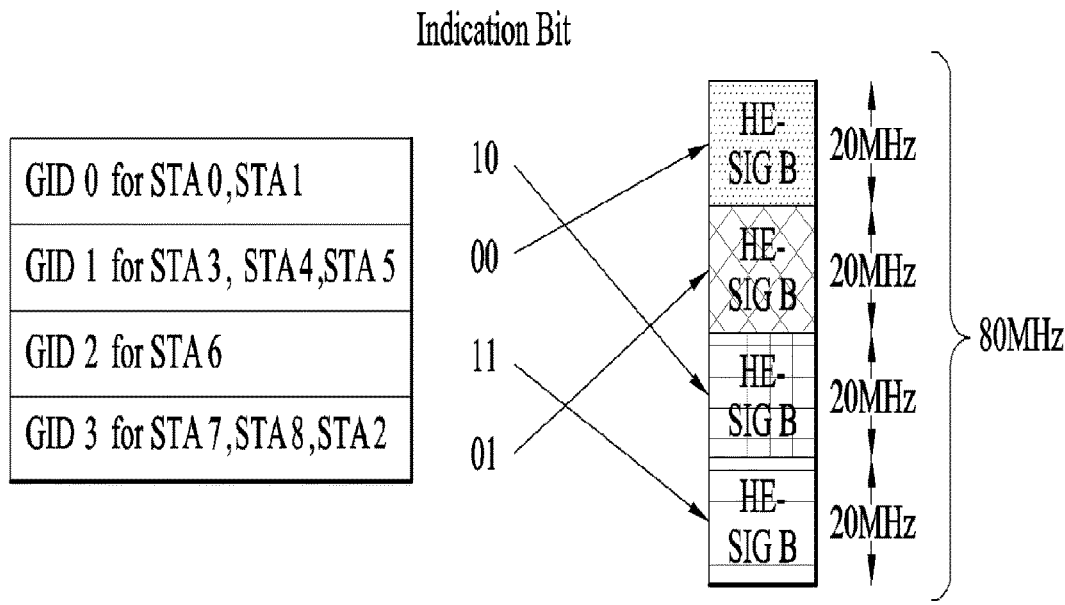
[Fig. 17]
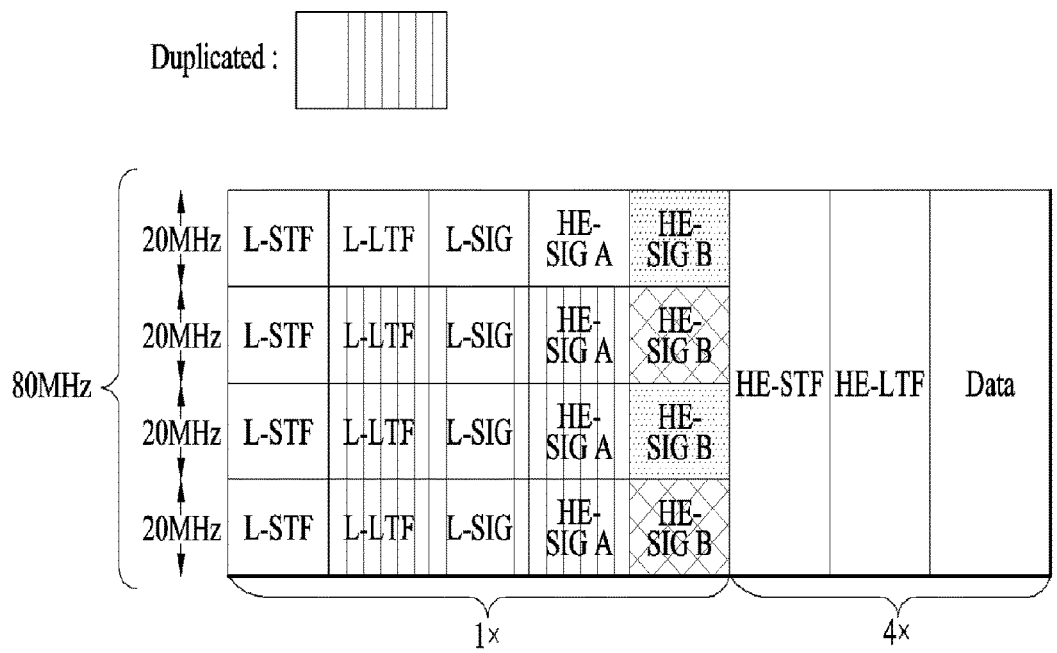

[Fig. 18]
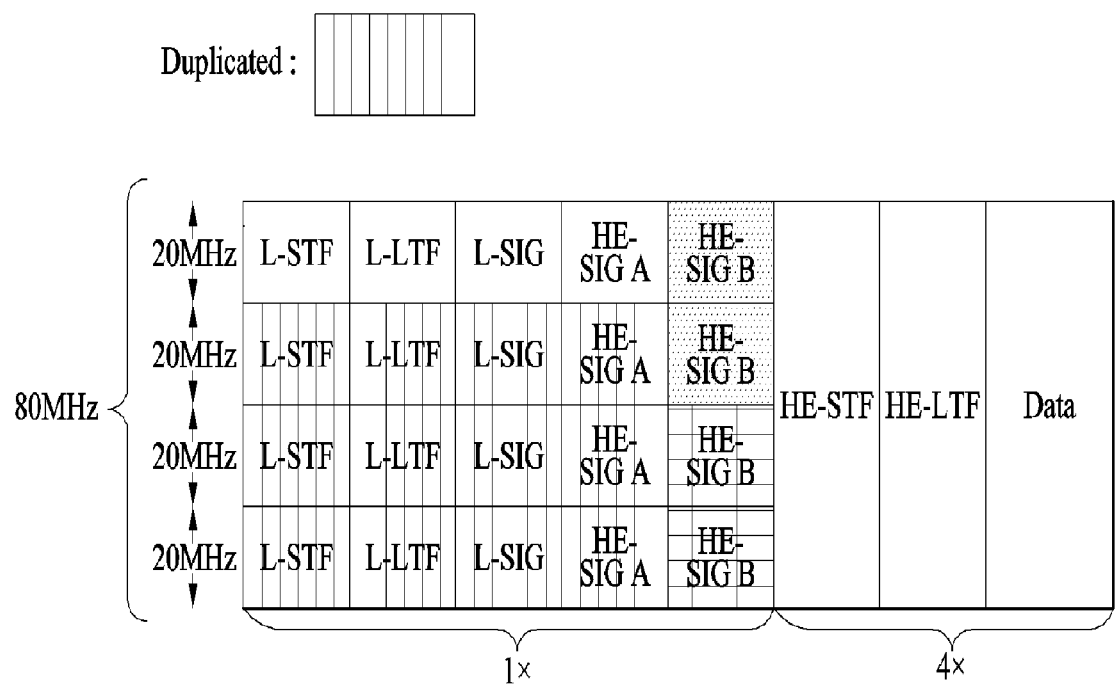

[Fig. 19]
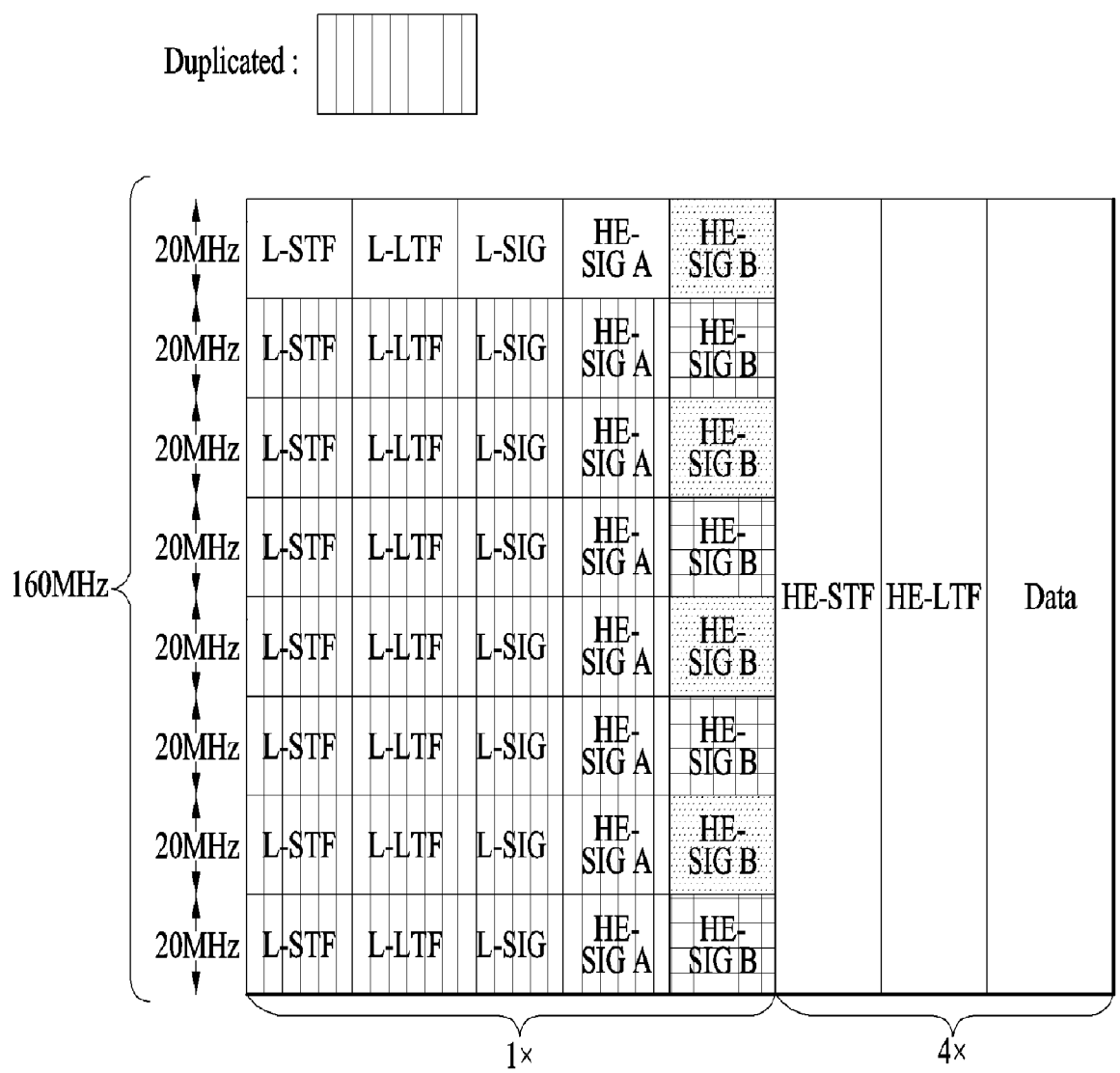

[Fig. 20]
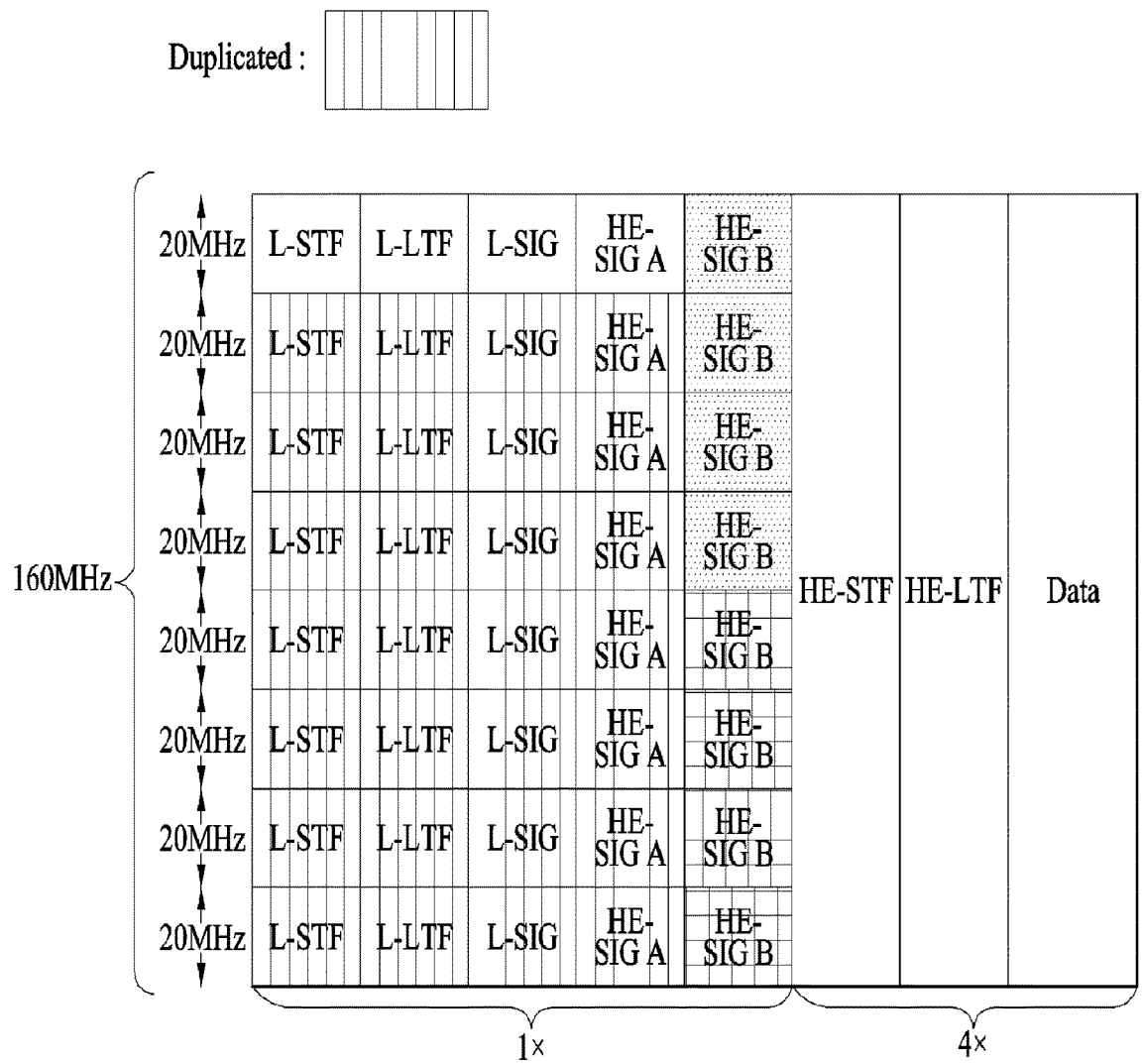

[Fig. 21]
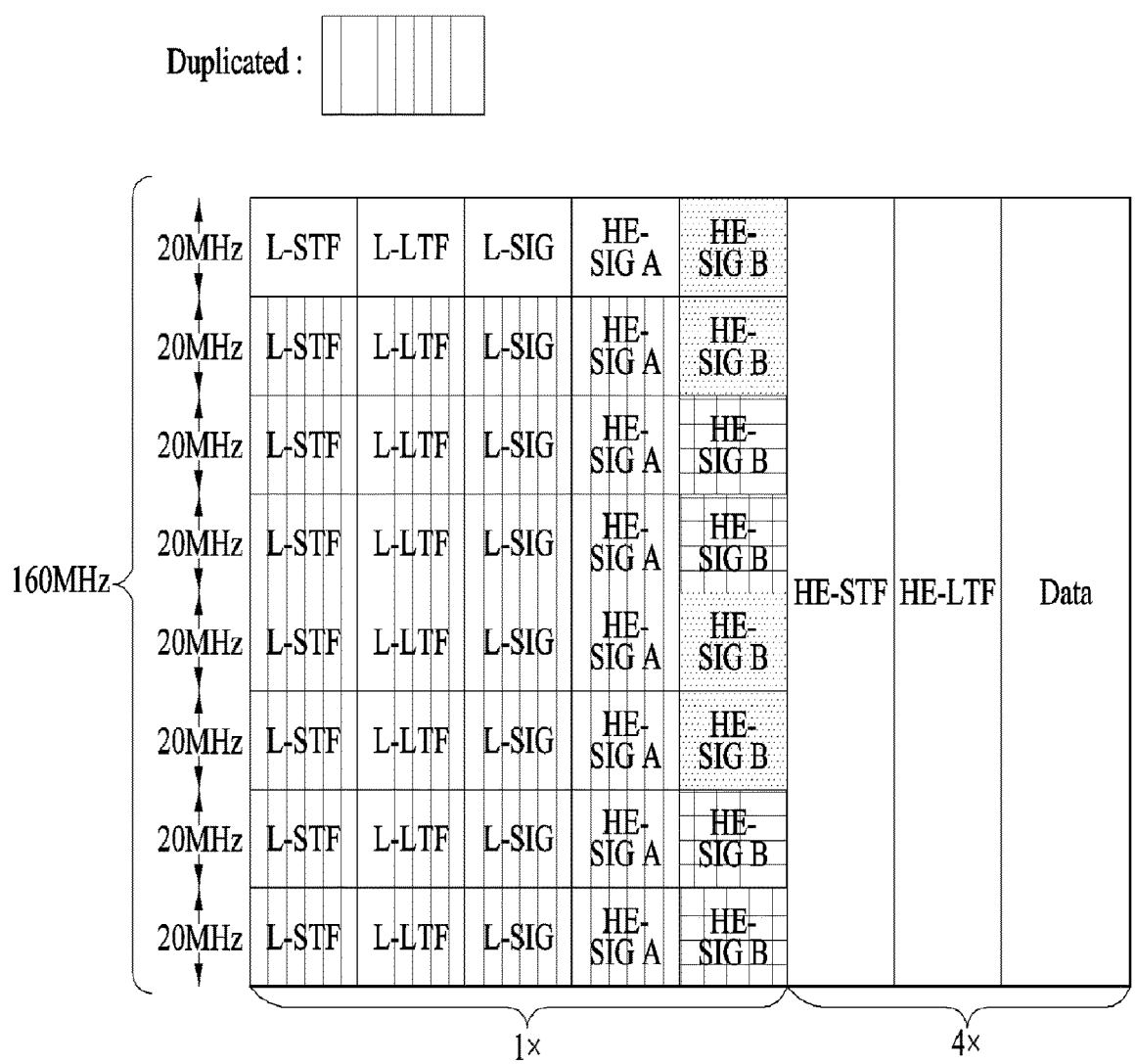

[Fig. 22]
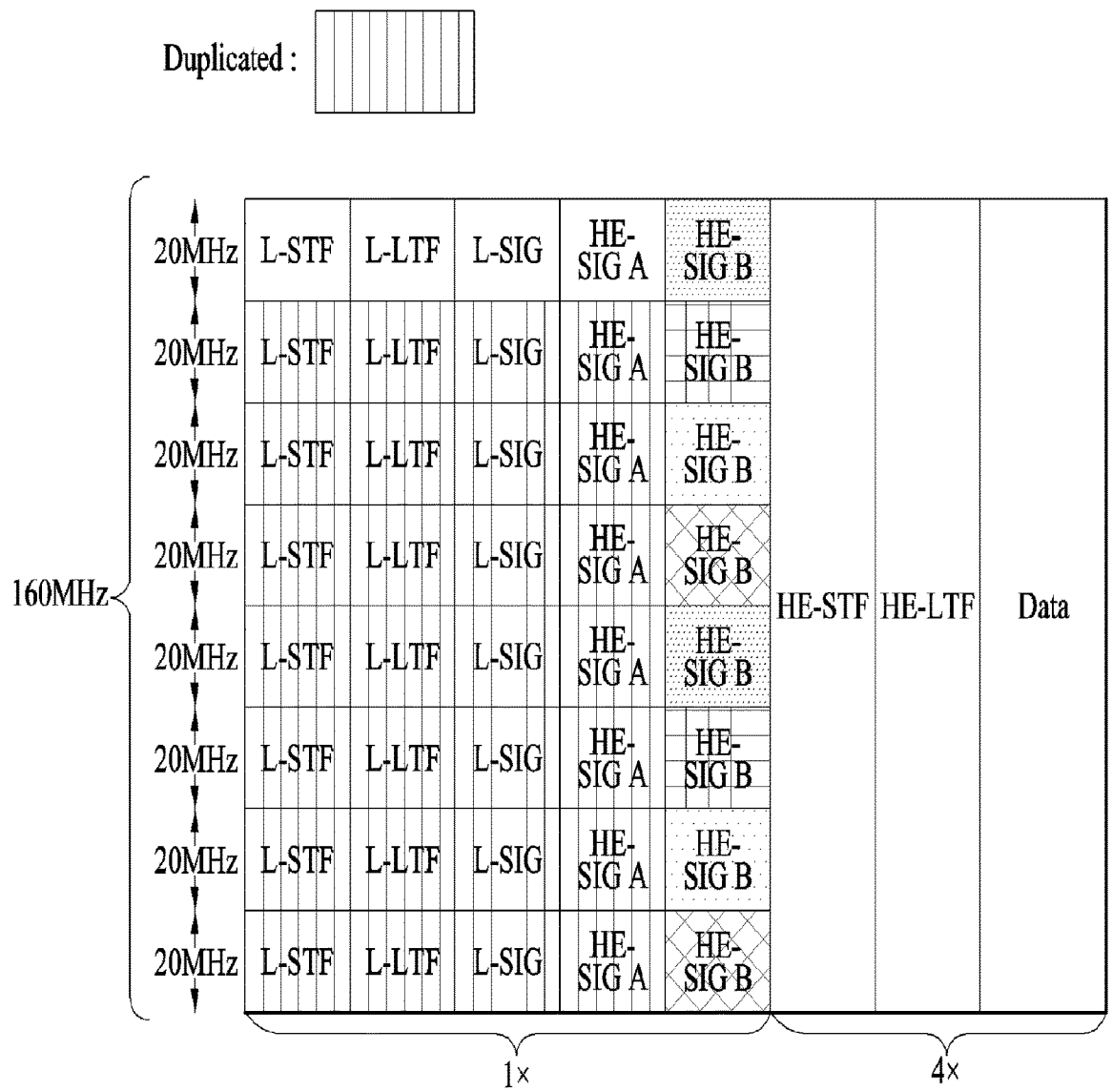

[Fig. 23]
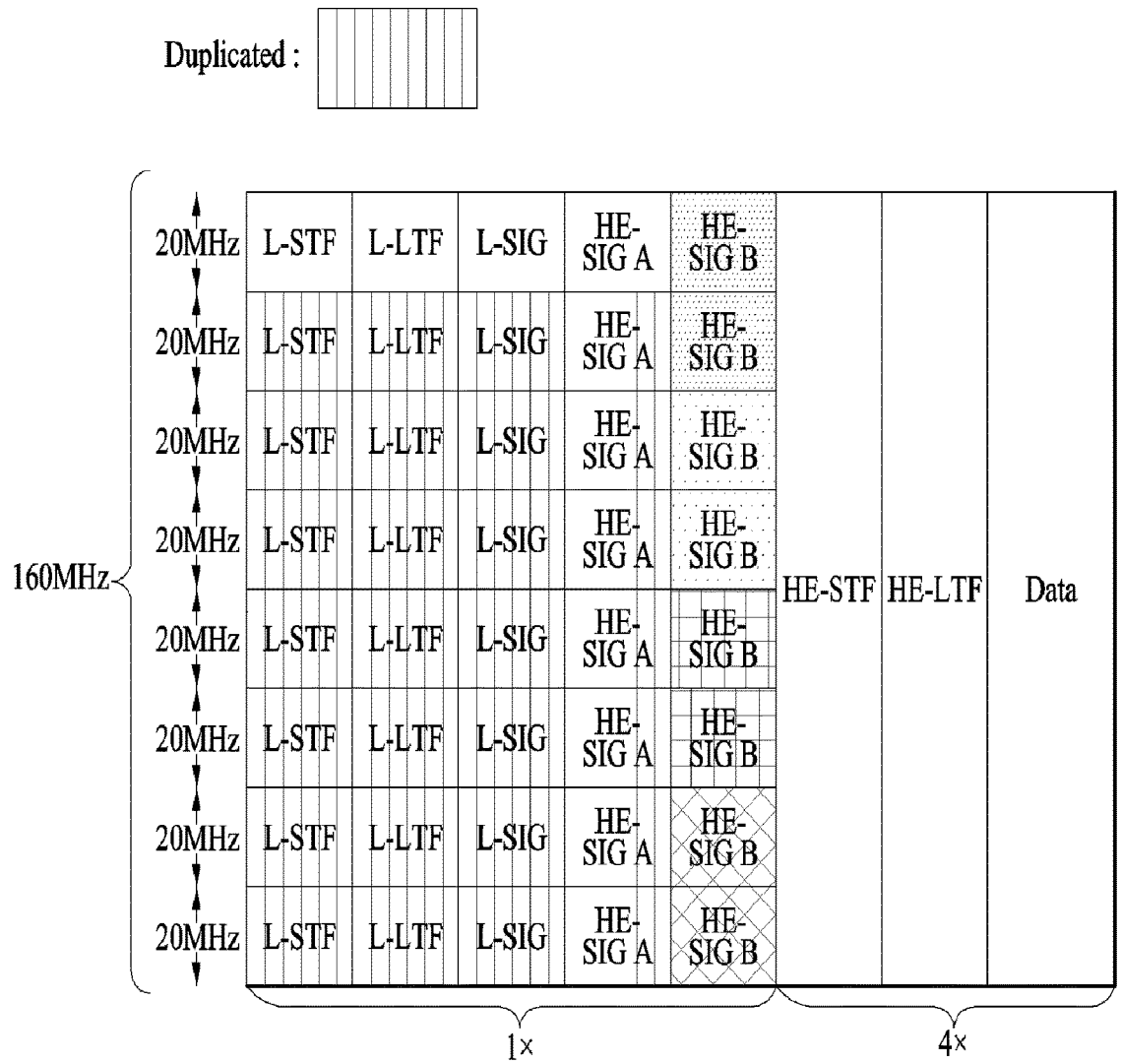
[Fig. 24]
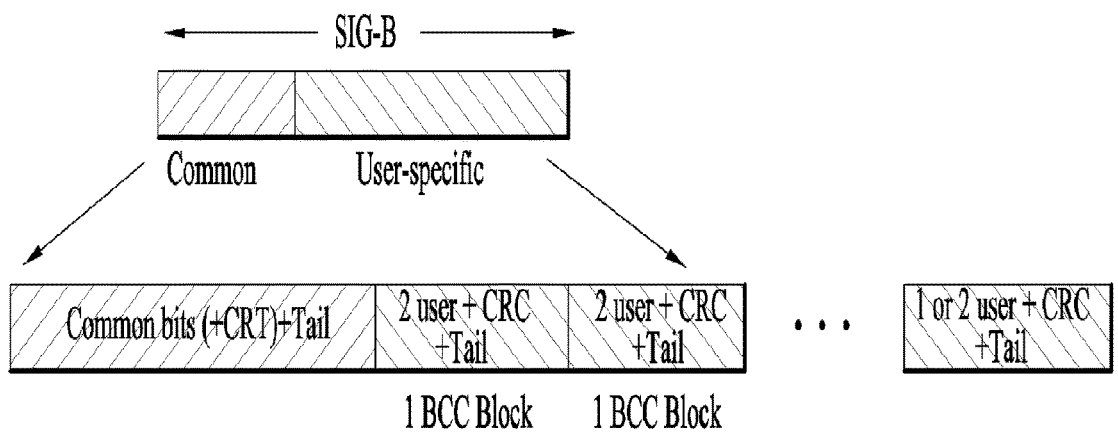

[Fig. 25]
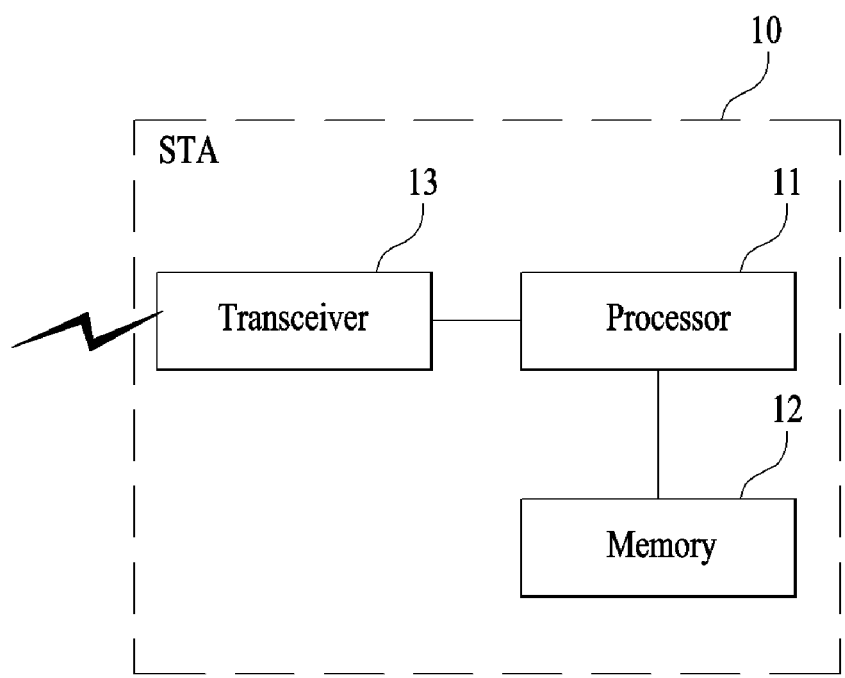

METHODS AND APPARATUS FOR TRANSMITTING/RECEIVING HE-SIG B

CROSS-REFERENCE TO RELATED APPLICATIONS

This application is the National Stage filing under 35 U.S.C. 371 of International Application No. PCT/KR2016/000728, filed on Jan. 22, 2016, which claims the benefit of U.S. Provisional Application No. 62/110,608, filed on Feb. 2, 2015, the contents of which are all hereby incorporated by reference herein in their entirety.

TECHNICAL FIELD

The following description is related with a wireless communication system, and more specifically, with methods and apparatus for transmitting/receiving frames including HE-SIG B in a Wireless Local Access Network (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, Institute of Electrical and Electronics Engineers (IEEE) 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

Furthermore, IEEE 802.11ac standard mostly operates in a 5 GHz band and provides a data rate of 1 Gbit/s or more. IEEE 802.11ac supports downlink Multi-User Multiple Input Multiple Output (MU-MIMO). A system that supports IEEE 802.11ac is called a Very High Throughput (VHT) system.

IEEE 802.11ax is being developed as a next-generation WLAN for handling a higher data rate and a higher user load. The scope of IEEE 802.11ax may include 1) the improvements of the 802.11 physical (PHY) layer and the Medium Access Control (MAC) layer, 2) the improvements of spectrum efficiency and area throughput, 3) performance improvement in an environment under an interference source, a crowded heterogeneous network environment, and an environment having heavy user load.

A proposed WLAN system may operate in a frequency band of 6 GHz or less or a frequency band of 60 GHz. The frequency band of 6 GHz or less may include at least one of a 2.4 GHz band and a 5 GHz band.

DISCLOSURE

Technical Problem

There are discussions on a frame structure to support IEEE 802.11ax technology. Specifically, when the system provides MU/OFDMA services to users, multiple signaling fields for users/streams would be transmitted. But, the detailed scheme for transmission of multiple signaling fields is not yet determined.

One object of the present invention is to provide methods and apparatus for transmission/reception of frames including HE-SIG B to address the above problem.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The object of the present invention can be achieved by providing a method for transmitting frames having a signaling field (SIG) for a second type of station (STA) in a wireless communication system, the method comprising: preparing a frame having a first part for a first type of STA and a second part for the second type of STA, wherein the second part includes a first signaling field (HE-SIG A) for common control information and a second signaling field (HE-SIG B) for signaling information comprising user specific control information, wherein first portions of the frame include different signaling information for the second signaling field (HE-SIG B) different from each other, and second portions of the frame include the same signaling information for the second signaling field (HE-SIG B) as the first portions; and transmitting the prepared frame to one or more STAs.

Preferably, the first portions and the second portions are interlaced in a frequency domain. Each of the first portions and each of the second portions may have 20 MHz bandwidth.

In one example, independent signaling information for the second signaling field (HE-SIG B) is to be transmitted for each 20 MHz bandwidth within a first 40 MHz bandwidth, wherein the signaling information of the first 40 MHz bandwidth is duplicated in a second 40 MHz bandwidth, when the frame is to be transmitted in a bandwidth equals to or greater than 80 MHz.

In one example, first signaling information for the second signaling field (HE-SIG B) is to be transmitted for a first 20 MHz bandwidth of the first 40 MHz bandwidth and second signaling information for the second signaling field (HE-SIG B) is to be transmitted for a second 20 MHz bandwidth of the first 40 MHz bandwidth, when the first signaling information and the second signaling information are independent signaling information. And the first signaling information is to be transmitted for a third 20 MHz bandwidth of the second 40 MHz bandwidth and the second signaling information is to be transmitted for a fourth 20 MHz bandwidth of the second 40 MHz bandwidth.

Also, in one example, the signaling information of the first 40 MHz bandwidth is further duplicated in a third and a fourth 40 MHz bandwidths, when the frame is transmitted in a 160 MHz bandwidth.

Preferably, the common control information of the first signaling field (HE-SIG A) is duplicated on each 20 MHz bandwidth.

And, the user specific control information may comprise resource unit assignment and MCS (Modulation and Coding Scheme) for each station (STA) for downlink Orthogonal Frequency Divisional Multiple Access (DL-OFDMA).

The signaling information of the second signaling field (HE SIG B) may include common control information part and user specific control information part.

The common control information of the first signaling field (HE-SIG A) may include resource allocation information for the second signaling field (HE-SIG B).

The first part of the frame may be duplicated on each 20 MHz bandwidth.

On the other hand, the second signaling field may include the user specific control information followed by one or more tail bits, and the tail bits are followed by one or more padding bits. In another aspect of the present invention, it is proposed a method for receiving frames having a signaling field (SIG) by a second type of station (STA) in a wireless communication system, the method comprising: receiving a frame having a first part for a first type of STA and a second part for the second type of STA, wherein the second part includes a first signaling field (HE-SIG A) for common control information and a second signaling field (HE-SIG B) for signaling information comprising user specific control information, wherein first portions of the frame include different signaling information for the second signaling field (HE-SIG B) different from each other, and second portions of the frame include the same signaling information for the second signaling field (HE-SIG B) as the first portions.

The second signaling field may include the user specific control information followed by one or more tail bits, and the tail bits are followed by one or more padding bits.

Preferably, the decoding the received frame may comprise decoding the second signaling field up to the tail bits.

In another aspect of the present invention, a station configured to transmit frames having a signaling field (SIG) for a second type of station (STA) in a wireless communication system, the station comprising: a processor configured to prepare a frame having a first part for a first type of STA and a second part for the second type of STA, wherein the second part includes a first signaling field (HE-SIG A) for common control information and a second signaling field (HE-SIG B) for signaling information comprising user specific control information, wherein the processor is configured to include independent signaling information for the second signaling field (HE-SIG B) on each 20 MHz bandwidth within a first 40 MHz bandwidth, and to duplicate the signaling information of the first 40 MHz bandwidth in a second 40 MHz bandwidth, when the frame is to be transmitted in a bandwidth equals to or greater than 80 MHz; and a transceiver connected to the processor and configured to transmit the prepared frame to one or more STAs, is provided.

Advantageous Effects

According to the present invention, a station can transmit control information more efficiently in IEEE 802.11ax system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 1 exemplarily shows an IEEE 802.11 system according to one embodiment of the present invention.

FIG. 2 is a diagram showing another exemplary structure of an IEEE 802.11 system to which the present invention is applicable.

FIG. 3 is a diagram showing still another exemplary structure of an IEEE 802.11 system to which the present invention is applicable.

FIG. 4 is a diagram showing an exemplary structure of a WLAN system.

FIG. 5 illustrates an example of a proposed PPDU format for IEEE 802.11ax.

FIG. 6 illustrates various PPDU formats according to IEEE 802.11a/g/n/ac for easy reference.

FIG. 7 illustrates another example of a proposed PPDU format for IEEE 802.11ax.

FIG. 8 illustrates yet another example of a proposed PPDU format for IEEE 802.11ax.

FIG. 9 illustrates an example of phase rotation for the classification of PPDUs.

FIG. 10 shows one example of the present invention using duplication of HE-SIG B.

FIG. 11 shows another example of the present invention using independent transmission of HE-SIG B.

FIGS. 12~14 show solutions to the problem when the signaling information of each HE-SIG B has different length in time domain.

FIG. 15 shows an example of signaling HE-SIG B location information.

FIG. 16 shows an example of using mapping relationship between channel indication bit and GID.

FIGS. 17~23 show examples of the preferred embodiment of the present invention.

FIG. 24 shows a detailed structure of a frame according to a preferred embodiment of the present invention.

FIG. 25 is a block diagram of a wireless apparatus according to an embodiment of the present invention.

MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3rd Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

PPDU Format

A Physical layer Protocol Data Unit (PPDU) is a data block that is generated in the physical (PHY) layer in IEEE 802.11 standard. In this paper, 'frame' refers to 'PPDU' unless there is opposite remark. However, the present invention may not be limited to the term 'PPDU' since the term of 'PPDU' can be changed during the standardization with the same meaning.

FIG. 5 illustrates an example of a proposed PPDU format for IEEE 802.11ax.

The PPDU may be is transmitted in a total of an 80-MHz bandwidth through four 20 MHz channels. The PPDU may be transmitted through at least one 20 MHz channel. This figure illustrates an example in which an 80-MHz band has been allocated to a single reception STA. The four 20 MHz channels may be allocated to different reception STAs.

The L-STF, the L-LTF, and the L-SIG may be transmitted in an Orthogonal Frequency Division Multiplexing (OFDM) symbol generated based on 64 Fast Fourier Transform (FFT) points (or 64 subcarriers) in each 20 MHz channel. They are for a legacy type of STA serving IEEE 802.11a/g/n/ac.

FIG. 6 illustrates various PPDU formats according to IEEE 802.11a/g/n/ac for easy reference.

An HE-SIG A may include common control information that is in common received by STAs receiving a PPDU. The HE-SIG A may be transmitted in two or three OFDM symbols. Also, HE-SIG A is duplicated on each 20 MHz bandwidth.

The following table illustrates information included in the HE-SIG A. The names of fields or the number of bits is only illustrative, and all the fields are not essential.

TABLE 1

| FIELD | DESCRIPTION |
| --- | --- |
| Bandwidth | Indicating a bandwidth in which a PPDU is transmitted. For example, 20 MHz, 40 MHz, 80 MHz |
| Color bits | Indicating an BSS ID |
| MCS | Indicating the MCS of HE-SIGB |
| N_sym | Indicating the number of symbol for HE-SIG B |
| Guard Interval (GI) indication | Indicating the CP length of HE-SIGB (ex. 0.4, 0.8, 1.6, 2.4) |
| MU indication | Indicating whether a PPDU is an SU-MIMO PPDU or an MU-MIMO PPDU |
| DL/UL indication | Indicating whether a PPDU is destined to an AP (uplink) or to an STA (downlink) |

The HE-STF may be used to improve AGC estimation in MIMO transmission. The HE-LTF may be used to estimate an MIMO channel.

The HE-SIG B may include user-specific information that is required for each STA to receive its own data (i.e., a Physical Layer Service Data Unit (PSDU)). The HE-SIG B may be transmitted in one or two OFDM symbols. For example, the HE-SIG B may include information about the length of a corresponding PSDU and the Modulation and Coding Scheme (MCS) of the corresponding PSDU. Following is an example of the contents of HE-SIG B.

TABLE 2

| FIELD | DESCRIPTION |
| --- | --- |
| Partial AID | |
| MCS | Indicating the MCS of Data for each STA |
| Stream information | Indicating the number of spatial streams for each STA, |
| Encoding | Indicating whether BCC or LDPC |
| Beam formed | Indicating whether beam forming or not |
| Guard Interval (GI) indication | Indicating the CP length of Data for each STA |
| Allocation information | Indicating a resource block (subchannel index or subband index) allocated to each STA in a bandwidth in which a PPDU is transmitted |
| STBC | Space Time Block Coding |
| length | Indicating the length of HE PPDU is transmitted in a bandwidth |

The L-STF, the L-LTF, the L-SIG, and the HE-SIG A may be duplicatively transmitted in a unit of 20 MHz channel. For example, when a PPDU is transmitted through four 20 MHz channels, the L-STF, the L-LTF, L-STG and the HE-SIG A are duplicately transmitted every 20 MHz channel.

An FFT size per unit frequency may be further increased from the HE-STF (or from the HE-SIG A). For example, 256 FFT may be used in a 20 MHz channel, 512 FFT may be used in a 40 MHz channel, and 1024 FFT may be used in an 80 MHz channel. If the FFT size is increased, the number of OFDM subcarriers per unit frequency is increased because spacing between OFDM subcarriers is reduced, but an OFDM symbol time may be increased. In order to improve efficiency, the length of a GI after the HE-STF may be configured to be the same as that of the GI of the HE-SIG A.

FIG. 7 illustrates another example of a proposed PPDU format for IEEE 802.11ax.

The PPDU formation is the same as that of FIG. 5 except that the HE-SIG B is placed behind the HE-SIG A. An FFT size per unit frequency may be further increased after the HE-STF (or the HE-SIG B).

FIG. 8 illustrates yet another example of a proposed PPDU format for IEEE 802.11ax.

An HE-SIG B is placed behind an HE-SIG A. 20 MHz channels are allocated to different STAs (e.g., an STA1, an STA2, an STA3, and an STA4). The HE-SIG B includes information specific to each STA, but is encoded over the entire band. That is, the HE-SIG B may be received by all the STAs. An FFT size per unit frequency may be further increased after the HE-STF (or the HE-SIG B).

If the FFT size is increased, a legacy STA supports conventional IEEE 802.11a/g/n/ac is unable to decode a corresponding PPDU. For coexistence between a legacy STA and an HE STA, an L-STF, an L-LTF, and an L-SIG are transmitted through 64 FFT in a 20 MHz channel so that they can be received by a conventional STA. For example, the L-SIG may occupy a single OFDM symbol, a single OFDM symbol time may be 4 us, and a GI may be 0.8 us.

The HE-SIG A includes information that is required for an HE STA to decode an HE PPDU, but may be transmitted through 64 FFT in a 20 MHz channel so that it may be received by both a legacy STA and an HE STA. The reason for this is that an HE STA is capable of receiving conventional HT/VHT PPDUs in addition to an HE PPDU. In this case, it is required that a legacy STA and an HE STA distinguish an HE PPDU from an HT/VHT PPDU, and vice versa.

FIG. 9 illustrates an example of phase rotation for the classification of PPDUs.

For the classification of PPDUs, the phase of the constellation of OFDM symbols transmitted after an L-STF, an L-LTF, and an L-SIG is used.

For the classification of HT/VHT PPDUs, the phases of three OFDM symbols transmitted after the L-SIG may be used in an HE-PPDU. The phases of the OFDM symbol#1 and the OFDM symbol#2 are not rotated, but the phase of the OFDM symbol#3 is counterclockwise rotated by 90 degrees. BPSK modulation is used in the OFDM symbol#1 and the OFDM symbol #2, and QBPSK modulation is used in the OFDM symbol#3. If the HE-SIG A is transmitted in three OFDM symbols after the L-SIG, it may be said that all the OFDM symbols #1/#2/#3 are used to send the HE-SIG A.

In the above explanation on proposed PPDU formats, it can be referred to as the PPDU has a first part ('L-part') for a first type of STA (i.e. legacy STA for IEEE 802.11a/g/n/ac) and a second part ('HE-part') for a second type of STA (i.e. 802.11ax STA). One symbol duration for some of HE-part (e.g. HE-STF/HE-LTF/Data) may be greater than 'X' times as FFT size increases. Preferably, 'X' can be 4, but it can be flexibly 2, 4 or the likes. And, information on 'one symbol duration' can be informed by HE SIG A.

Based on the above explanation, the transmission/reception scheme of the HE-LTF is explained.

HE-SIG B Structure

Simple way of transmitting HE-LTF including user specific information for wideband channel would be based on (i) duplication of HE-SIG B for 20 MHz and (ii) independent transmission of HE-SIG B for each of 20 MHz channel.

1st Approach—Duplication Based Scheme

FIG. 10 shows one example of the present invention using duplication of HE-SIG B.

When HE-SIG B is to be transmitted via 80 MHz channels as in FIG. 10, the signaling information of HE-SIG B for 20 MHz can be duplicated 4 times through 80 MHz channels. In this case, STA/AP receiving the duplicated HE-SIG B would accumulate the multiple HE-SIG B signals, thereby increase the reliability of them.

Since the STA/AP accumulates the duplicated signals of HE-SIG B, the gain of the received signals can be improved. For example, when HE-SIG B is transmitted via 40 MHz channel, HE-SIG B is transmitted 2 times, so STA/AP can get 3 dB gain. When HE-SIG B is transmitted via 80 MHz channel, STA/AP receiving it can get 6 dB gain.

So, the STA/AP transmitting HE-SIG B may transmit it with higher MCS level comparing to the non-duplicated case. Of course, the MCS level itself may be determined based on the channel status between transmitting STA/AP and receiving STA/AP, but the duplication of HE-SIG B would be additionally considered at determining MCS level.

In one example, the MCS level used for HE-SIG B can be determined based on the signals of RTS/CTS frames received and accumulated by the STA/AP. But, it is not to be limited as RTC/CTS frames for determining the MCS level of HE-SIG B. STA/AP may use other signals received in duplicated manner as HE-SIG B.

When STA/AP receiving the duplicated HE-SIG B accumulates them, STA/AP may further consider the interference level of specific channel. For example, when STA/AP received duplicated signals (e.g. HE-SIG A or pilot signals in HE-SIG A) other than the HE-SIG B, STA/AP may decide that the interference level of specific 20 MHz channel is above the threshold level. In this case, STA/AP may exclude the HE-SIG B signal received via the specific 20 MHz channel while accumulating the HE-SIG B signals of other 20 MHz channels. Interference of specific channel can be determined based on auto-correlation using pilot signals in HE-SIG A or HE-SIG B.

STA/AP receiving signals may determine the interference level based on the RSSI of HE-SIG A received through the primary channel and RSSI of HE-SIG A received via other channels other than the primary channel. When the interference level of that channel exceeds a threshold level, the HE-SIG B received through that channel is not accumulated.

In another example, the STA/AP may use L-LTF to determine the interference level. When the interference level of the specific channel exceeds the threshold, the HE-SIG B received through that channel is not accumulated.

HE-SIG A may be one symbol signal, and each HE-SIG A symbol may include 4 pilot tones. Here, each symbol may use different pilot pattern. In one embodiment, the combination of pilot pattern of HE-SIG A may indicate the number of HE-SIG B symbols. For example, when the symbols for HE-SIG A is 2 and the length of pilot sequence is 4, 4 orthogonal pilot sequence can be used based on Hadamard matrix.

Pilot Sequence=(1 , 1, 1, 1), (1, −1, 1, −1), (1, 1, −1, −1), (1, −1, −1, 1)

Based on these, the number of HE-SIG B symbols can be indicated as following:

TABLE 3

| Index | Pilot of First HE-SIGA symbol | Pilot of Second HE-SIGA symbol | Number of HE-SIGB symbol |
|---|---|---|---|
| 1 | (1, 1, 1, 1) | (1, 1, 1, 1) | 1 |
| 2 | (1, 1, 1, 1) | (1, -1, 1, -1) | 2 |
| 3 | (1, 1, 1, 1) | (1, 1, -1, -1) | 3 |
| 4 | (1, 1, 1, 1) | (1, -1, -1, 1) | 4 |
| 5 | (1, -1, 1, -1) | (1, 1, 1, 1) | 5 |
| 6 | (1, -1, 1, -1) | (1, -1, 1, -1) | 5 |
| 7 | (1, -1, 1, -1) | (1, 1, -1, -1) | 6 |
| 8 | (1, -1, 1, -1) | (1, -1, -1, 1) | 7 |
| 9 | (1, 1, -1, -1) | (1, 1, 1, 1) | 8 |
| 10 | (1, 1, -1, -1) | (1, -1, 1, -1) | 9 |
| 11 | (1, 1, -1, -1) | (1, 1, -1, -1) | 10 |
| 12 | (1, 1, -1, -1) | (1, -1, -1, 1) | 11 |
| 13 | (1, -1, -1, 1) | (1, 1, 1, 1) | 12 |
| 14 | (1, -1, -1, 1) | (1, -1, 1, -1) | 13 |
| 15 | (1, -1, -1, 1) | (1, 1, -1, -1) | 14 |
| 16 | (1, -1, -1, 1) | (1, -1, -1, 1) | 15 |

By using this scheme, the overhead on HE-SIG A and preamble can be reduced.

In another embodiment, the combination of pilot pattern of HE-SIG A symbols may indicate other channel configuration information, such as Guard Interval (GI) of HE-SIG B etc. The channel configuration information may be configured for each 20 MHz channel. And, in one example, pilot pattern of the 1st symbol of HE-SIG A may indicate available channel bandwidth and the combination of pilot patterns of the 1st and later symbols may indicate the channel configuration information within the channel bandwidth.

2nd Approach—Independent Transmission Scheme

FIG. 11 shows another example of the present invention using independent transmission of HE-SIG B.

When HE-SIG B is to be transmitted via 80 MHz channels as in FIG. 11, the signaling information of HE-SIG B for 20 MHz can be independently configured for each 20 MHz channels.

As shown in FIG. 11, HE-SIG B may be transmitted with the 1x structure as the legacy part (e.g. L_STF, L-LTF and L-SIG) does. And, the length of L-STF+L-LTF+L-SIG+HE-SIG A and HE-SIG B in time domain shall be equal to each other on each 20 MHz channel in wide bandwidth situation.

However, as stated above, the signaling information of HE-SIG B includes user specific information. When the signaling information of HE-SIG B is independently configured, the length of each HE-SIG B may be different in time domain.

FIGS. 12~14 show solutions to the problem when the signaling information of each HE-SIG B has different length in time domain.

As shown in FIG. 12, in order to align the time domain length of each HE-SIG B signaling information, padding can be used. The length of the padding can be determined based on the maximum length among 4 HE-SIG B signaling information.

Also, as shown in the left side of FIG. 13, the padding can be generated based on the copy of the first part of the HE-SIG B signaling information. Or, as shown in the right side of FIG. 13, the padding can be generated based on the copy of the last part of the HE-SIG B signaling. The length of the copy can be determined as stated above. By receiving the HE-SIG B signaling information with the padding, the STA/AP receiving it can accumulate the signals, thereby increase the reliability of it.

The encoding of the signaling information of the HE-SIG B may be performed by using convolutional coding (CC). So, the tail bits of this encoding can be added as shown in FIG. 14. Decoding of the HE-SIG B can be performed only within the determined HE-SIG B length.

When the same signals are padded, PAPR can be increased. So, in one example, the padding can be done by using random sequences or orthogonal sequences.

When HE-SIG B is transmitted by using the same numerology as legacy part (e.g. MCS 0 and BPSK, 1/2 coding and 6 Mbps data rate), the length of HE-SIG B information bit can be the multiple of 24 bit (or, 26 bit). So, the padding bit length of each channel can be acquired based on the following.

TABLE 4

Z = number of HE-SIGB symbol
x = number of HE-SIGB information bit
Padding bit = (Z*(24bit) ? x) ? (CRC bit+ tail bit)

Here, 'CRC bit' can be 4~8 bit and 'tail bit' can be 6 bit.

HE-SIG B can be transmitted using different MCS other than MCS 0. In this case, the padding length can be determined by considering the MCS level.

TABLE 5

Z = number of HE-SIGB symbol
x = number of HE-SIGB information bit
NSD = Number of complex data number
Y (Bit per symbol) = (NSD * Mod order * code rate)
Padding bit = (Z*Y ? x) ? (CRC bit+ tail bit)

In another example, in order to align the time domain length of each HE-SIG B channel, the signaling information of HE-SIG B can be repeated based on the determined length. The length can be determined based on the maximum length of all HE-SIG Bs, or based on the minimum common multiple of HE-SIG Bs. STA/AP receiving this repeated HE-SIG B can enhance the reliability as stated above.

Signaling Information of HE-SIG A and HE-SIG B

As explained above, HE-SIG A comprises common control information and HE-SIG B comprises user specific control information. But, HE-SIG B also can be configured to have common part and user specific part.

HE-SIG A may include configuration information of HE-SIG B, such as the number of symbols for HE-SIG B and bandwidth of each HE-SIG B. This information can be conveyed based on the combination of pilot pattern of HE-SIG A, as stated above.

When HE-SIG B is independently configured for each 20 MHz channel, the configuration information of them can be informed by HE-SIG A. But, in another example, that information may be informed based on the common part of HE-SIG B. The receiving STA/AP may avoid blind decoding overhead based on the HE ?SIG B location information (e.g. BW of HE-SIG B) in HE-SIG A or common part of HE-SIG B.

FIG. 15 shows an example of signaling HE-SIG B location information.

As shown in FIG. 15, The HE-SIG B location information can be signaled based on Group ID (GID) of STAs. But, PID of each STA can also be used.

In FIG. 15, GID 0 is for STA 0 and STA 1, and it informs the location of the 1st HE-SIG B. GID 1 is for STAs 3, 4 and 5, GID 2 is for STA 6 and GID 3 is for STAs 7, 8 and 2. But, it is only example of configuration.

On the other hand, the mapping relation between GID (or PID) and channel indication bits can be predetermined. By using this predetermined mapping relationship, the channel can be more flexibly allocated to each (group) of STAs.

FIG. 16 shows an example of using mapping relationship between channel indication bit and GID.

When maximum bandwidth is 80 MHz, there are 4 20 MHz channels, so channel indication bits may have 2 bit length. Following Table shows one example of channel indication bits.

TABLE 6

| Index | Indication Bit | Channel Number |
|---|---|---|
| 1 | 00 | 1 |
| 2 | 01 | 2 |
| 3 | 10 | 3 |
| 4 | 11 | 4 |

By using this channel indication bits, the channels of HE-SIG B can be more flexibly allocated to each (group) of STAs, as shown in FIG. 16. Channel indication bit can be differently determined based on BSS capable BW, so it may be different for each BSS. But, it can be commonly determined based on the maximum bandwidth supported by 11ax system.

3rd Approach—Hybrid Scheme (Using Both of Duplication and Independent Transmission)

In the preferred embodiment of the present invention, the signaling information of HE-SIG B is independently configured within specific bandwidth, but it is duplicated in other channels of the same bandwidth.

FIG. 17 shows one example of the preferred embodiment of the present invention.

As shown in FIG. 17, the signaling information of HE-SIG B for 40 MHz channel may include 2 independent signaling information of HE-SIG B for 20 MHz channel, as the above explained 2nd approach. But, the signaling information of HE-SIG B for the 1st 40 MHz channel is duplicated on the 2nd 40 MHz channel, when the maximum bandwidth is 80 MHz. For example, when the 2 independent signaling informations for 20 MHz channel are identified as 'A' and 'B', the signaling information for 80 MHz channel would be 'A', 'B', 'A' and 'B' as shown in FIG. 17.

The allocation information of the HE-SIG B may be included within the HE-SIG B transmitted through that channel. For example, HE-SIG B transmitted through the 1st and 3rd channel may include allocation information of the 1st and 3rd 20 MHz channels. Each of HE-SIG B allocation information may be configured by using the variable RU size like as 26 units, 52 units, 108 units and 242 units for each 20 MHz channel.

On the other hand, the HE-SIG B transmitted through the 1st 20 MHz channel may include allocation information for the 1st 40 MHz channel of data part. In this case, allocation information may be configured by using the variable RU size like as 26 units, 52 units, 108 units and 242 units considering 40 MHz as the basic chunk, or configured by using the variable RU size like as 26 units, 52 units, 108 units and 242 units for each 20 MHz channel.

The above mapping relation between the allocation information and each HE-SIG B is only exemplary. Also, the location of independent signals within 40 MHz channel may be changed.

By duplicating 40 MHz signals, the number of encoder and decoder may be 2, so it is easy for configuration.

FIG. 18 shows another example of the preferred embodiment of the present invention.

In FIG. 18, the signaling information of HE-SIG B for 20 MHz channel is duplicated within the 1st 40 MHz channel. But, the signaling information of HE-SIG B for the 2nd 40 MHz channel can be independent from that of the 1st 40 MHz channel. For example, when the 2 independent signaling informations for 20 MHz channel are identified as 'A' and 'B', the signaling information for 80 MHz channel would be 'A', 'A', 'B' and 'B' as shown in FIG. 18.

FIG. 19 shows one example of the preferred embodiment of the present invention. Specifically, FIG. 19 is for the case when the maximum bandwidth is 160 MHz.

The principle explained for FIG. 17 is also applied to this case. That is, the signaling information of HE-SIG B for 40 MHz channel may include 2 independent signaling information of HE-SIG B for 20 MHz channel. But, the signaling information of HE-SIG B for the 1st 40 MHz channel is duplicated on the 2nd, 3rd and 4th 40 MHz channels, when the maximum bandwidth is 160 MHz.

For example, when the 2 independent signaling information for 20 MHz channel are identified as 'A' and 'B', the signaling information for 160 MHz channel would be 'A', 'B', 'A', 'B', 'A', 'B', 'A' and 'B' as shown in FIG. 19.

By using the same structure as in 80 MHz, the size of encoder and decoder can be the same. Also, by using the hybrid scheme, flexibility and simplicity can be both achieved.

FIGS. 20~23 show other examples of the preferred embodiment of the present invention.

FIGS. 20~23 are also for the case when the maximum bandwidth is 160 MHz. Using the same definition of 'A' and 'B' above: FIG. 20 shows 'A', 'A', 'A', 'A', 'B', 'B', 'B' and 'B' structure; FIG. 21 shows 'A', 'A', 'B', 'B', 'A', 'A', 'B' and 'B' structure; FIG. 22 shows 'A', 'B', 'C', 'D', 'A', 'B', 'C' and 'D' structure; and FIG. 23 shows 'A', 'A', 'B', 'B', 'C', 'C', 'D' and 'D' structure.

FIG. 24 shows a detailed structure of a frame according to a preferred embodiment of the present invention.

As shown in FIG. 24, HE-SIG B may include common part and user-specific part. The common part may include common bits representing common control information followed by tail bits. The user-specific part may have signaling information specific to each user.

Preferably, two users are grouped together and jointly encoded in each BCC block in the user specific section of HE-SIG-B. The last user information may be immediately followed by tail bits (regardless of whether the number of users is odd or even) and padding bits may be only added after those tail bits.

In one example, CRC may be added as shown in FIG. 24, but it can be omitted.

When the HE-SIG B field with padding bits is received by a STA, it would be better for the STA to decode it up to the tail bits. That is, STA need not try to decode it up to the padding bits.

FIG. 25 is a block diagram of a wireless apparatus according to an embodiment of the present invention.

An STA 10 may include a processor 11, a memory 12, and a transceiver 13. The transceiver 13 may transmit/receive a wireless signals, for example, implement the physical layer of an IEEE 802 system. The processor 11 is connected to the transceiver 13 and implements the physical layer and/or the MAC layer of the IEEE 802 system. The processor 11 may be configured to perform operations according to the foregoing various embodiments of the present invention. Further, a module for performing operations according to the various embodiments of the present invention may be stored in the memory 12 and executed by the processor 11. The memory 12 may be located inside or outside the processor 11 and be connected to the processor 11 by a known means.

In FIG. 25, the STA 10 according to an embodiment of the present invention may be configured to perform a response process. The processor 11 may be configured to transmit a frame (PPDU) requiring a response frame to another STA through the transceiver 13.

The specific configuration of the above-described apparatus may be implemented so that the foregoing various embodiments of the present invention may be applied independently or two or more thereof may be applied simultaneously. A repeated description is omitted for clarity.

The embodiments of the present invention may be implemented by various means, for example, hardware, firmware, software, or a combination thereof.

In a hardware configuration, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and be executed by a processor. The memory unit may be located at the interior or exterior of the processor and may transmit and receive data to and from the processor via various known means.

INDUSTRIAL APPLICABILITY

While the various embodiments of the present invention have been described in the context of an IEEE 802.11 system, the present invention is also applicable to various mobile communication systems by the same scheme.

What is claimed is:

1. A method for transmitting a frame in a wireless communication system, the method comprising:
   preparing the frame having a first part for a first type of station (STA) and a second part for a second type of STA; and
   transmitting the prepared frame to one or more STAs,
   wherein the second part includes a first signaling field (HE-SIG A) and a second signaling field (HE-SIG B),
   wherein HE-SIG B includes a user specific control information part for signaling user specific control information for an Orthogonal Frequency Divisional Multiple Access (OFDMA) scheme or a Multi-User Multiple-Input Multiple-Output (MU-MIMO) scheme,
   wherein the prepared frame is transmitted in a bandwidth of 80 MHz or 160 MHz,
   wherein first signaling information for HE-SIG B transmitted via a first 20 MHz channel and second signaling information for HE-SIG B transmitted via a second 20 MHz channel have resource allocation information for different frequency regions adjacent to each other,
   wherein the first signaling information includes resource allocation information for a first and a third frequency regions,
   wherein the second signaling information includes resource allocation information for a second and a fourth frequency regions,
   wherein the first, the second, the third, and the fourth frequency regions are non-overlapping different frequency regions, and are contiguous frequency regions in a sequence of the first, the second, the third, and the fourth frequency regions,
   wherein the first 20 MHz channel and the second 20 MHz channel are within a first 40 MHz channel, and
   wherein the first signaling information and the second signaling information transmitted via the first 40 MHz channel are duplicated in a second 40 MHz channel such that the resource allocation information for the first and the third frequency regions and the resource allocation information for the second and the fourth frequency regions are alternately allocated within an 80 MHz channel.

2. The method of claim 1, wherein the first signaling information and the second signaling information are further duplicated in a third 40 MHz channel and a fourth 40 MHz channel when the frame is transmitted in the 160 MHz bandwidth.

3. The method of claim 1, wherein common control information of HE-SIG A is duplicated in each 20 MHz channel.

4. The method of claim 1, wherein HE-SIG A includes resource allocation information for HE-SIG B.

5. The method of claim 1, wherein the first part is duplicated in each 20 MHz bandwidth.

6. The method of claim 1, wherein padding is appended to a shorter of the first signaling information and the second signaling information if a length of the first signaling information and a length of the second signaling information are different such that the first signaling information and the second signaling information end at a same time.

7. The method of claim 6, wherein:
   a shorter of the first signaling information and the second signaling information includes the user specific control information followed by one or more tail bits; and
   the one or more tail bits are followed by one or more padding bits.

8. A method for receiving frames having a signaling field (SIG) by a second type of station (STA) in a wireless communication system, the method comprising:
   receiving a frame having a first part for a first type of STA and a second part for the second type of STA; and
   decoding the received frame,
   wherein the second part includes a first signaling field (HE-SIG A) and a second signaling field (HE-SIG B),
   wherein HE-SIG B includes a user specific control information part for signaling user specific control information for an Orthogonal Frequency Divisional Multiple Access (OFDMA) scheme or a Multi-User Multiple-Input Multiple-Output (MU-MIMO) scheme,
   wherein the frame is received in a bandwidth of 80 MHz or 160 MHz,
   wherein first signaling information for HE-SIG B received via a first 20 MHz channel and second signaling information for HE-SIG B received via a second 20 MHz channel have resource allocation information for different frequency regions adjacent to each other,
   wherein the first signaling information includes resource allocation information for a first and third frequency regions,
   wherein the second signaling information includes resource allocation information for a second and fourth frequency regions,
   wherein the first, the second, the third, and the fourth frequency regions are non-overlapping different frequency regions, and are contiguous frequency regions in a sequence of the first, the second, the third, and the fourth frequency regions, wherein the first 20 MHz channel and the second 20 MHz channel are within a first 40 MHz channel, and wherein the first signaling information and the second signaling information received via the first 40 MHz channel and are duplicated in a second 40 MHz bandwidth, thereby the resource allocation information for the first and third frequency regions and the resource allocation information for the second and the fourth frequency regions are alternately allocated within an 80 MHz channel.

9. The method of claim 8, wherein padding is appended to a shorter of the first signaling information and the second signaling information if a length of the first signaling information and a length of the second signaling information are different such that the first signaling information and the second signaling information end at a same time.

10. The method of claim 9, wherein:
a shorter of the first signaling information and the second signaling information includes the user specific control information followed by one or more tail bits; and
the one or more tail bits are followed by one or more padding bits.

11. The method of claim 10, wherein decoding the received frame comprises decoding the shorter of the first signaling information and the second signaling information before decoding the one or more tail bits.

12. The method of claim 8, wherein the first signaling information and the second signaling information are further duplicated in a third and a fourth 40 MHz bandwidth when the frame is transmitted in the 160 MHz bandwidth.

13. The method of claim 8, wherein common control information of HE-SIG A is duplicated in each 20 MHz channel.

14. The method of claim 8, wherein HE-SIG A includes resource allocation information for the HE-SIG B.

15. The method of claim 8, wherein the first part is duplicated in each 20 MHz channel.

* * * * *

UNITED STATES PATENT AND TRADEMARK OFFICE
CERTIFICATE OF CORRECTION

| | |
|---|---|
| PATENT NO. | : 11,057,253 B2 |
| APPLICATION NO. | : 15/540517 |
| DATED | : July 6, 2021 |
| INVENTOR(S) | : Dongguk Lim et al. |

It is certified that error appears in the above-identified patent and that said Letters Patent is hereby corrected as shown below:

In the Claims

In Column 17, Line 8, Claim 8:
Delete "channel and are duplicated in a second 40MHz band-" and insert --channel are duplicated in a second 40MHz band- --

Signed and Sealed this
Fifteenth Day of October, 2024

Katherine Kelly Vidal
*Director of the United States Patent and Trademark Office*